Jan. 28, 1969

C. G. FISKE 3,423,856

TRACTION DEVICE FOR SNOW VEHICLES

Filed Oct. 14, 1965

INVENTOR.
CHESTER G. FISKE
BY
Adams & Cwayna
ATTORNEYS

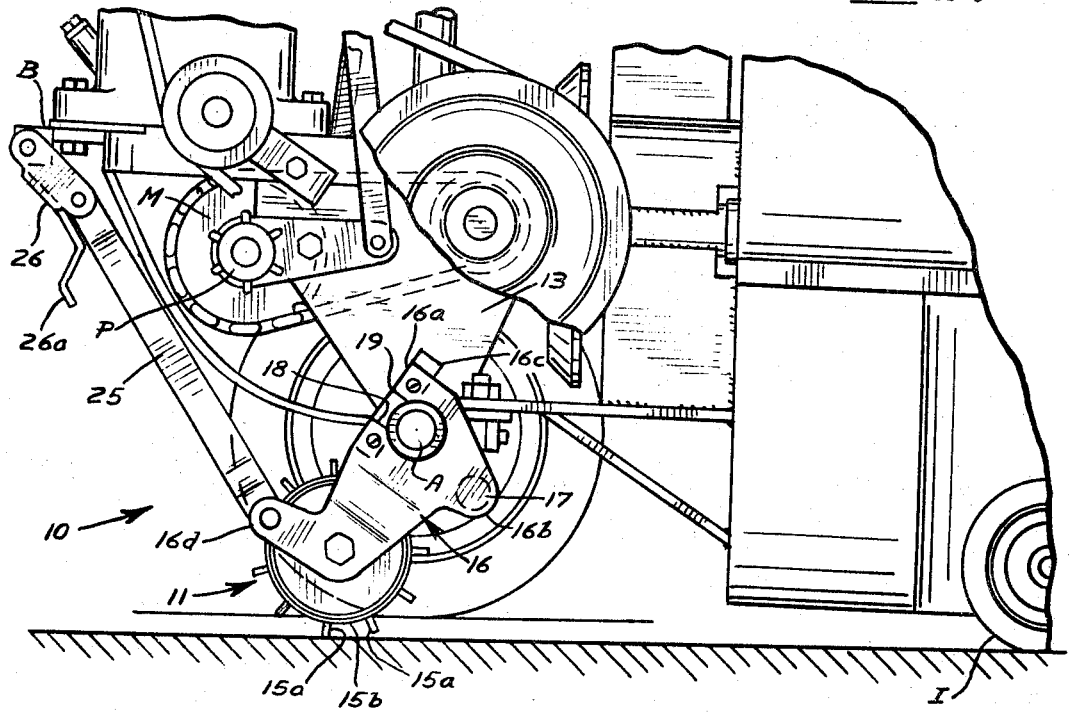
FIG. 3
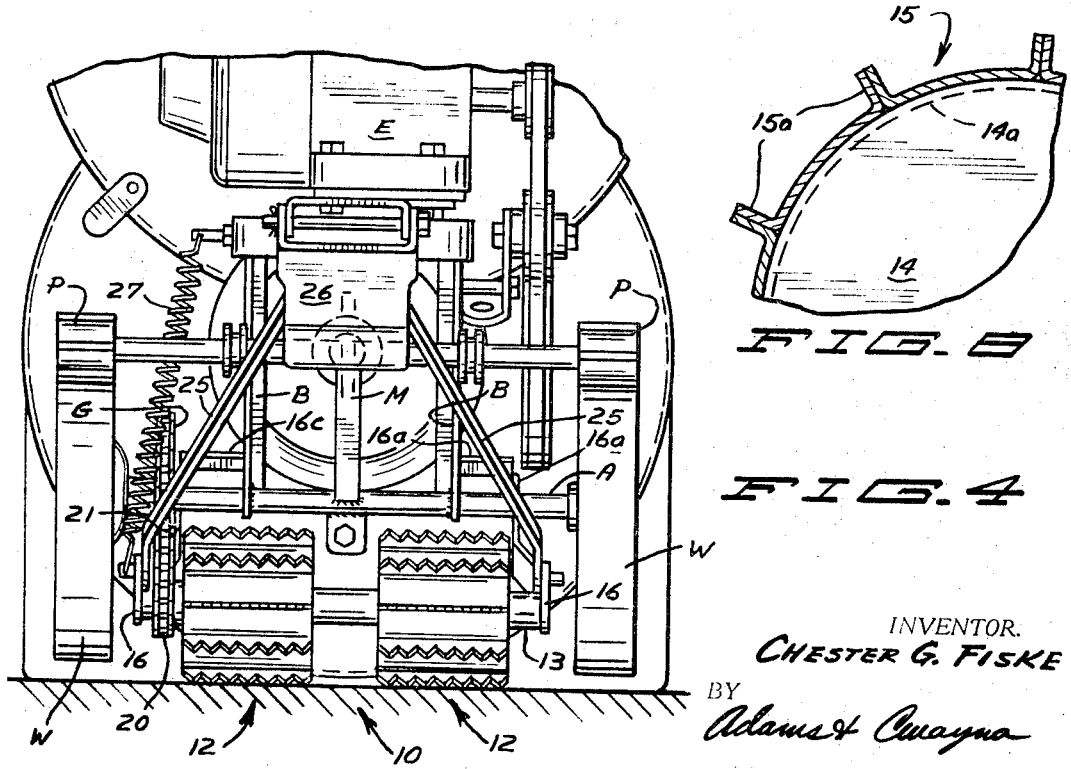
FIG. 8
FIG. 4
INVENTOR.
CHESTER G. FISKE
BY Adams & Cwayne
ATTORNEYS

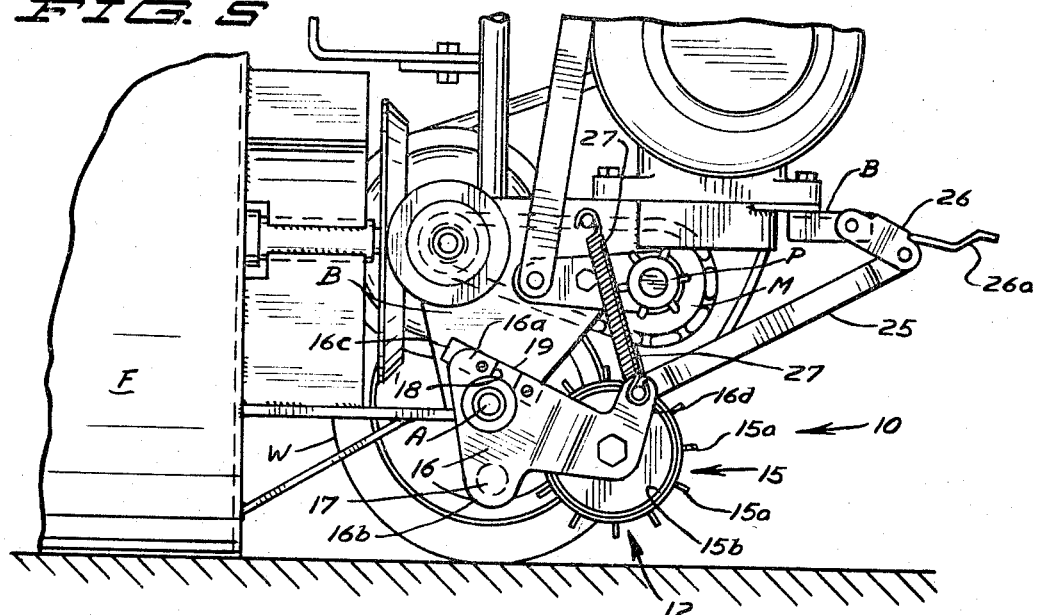
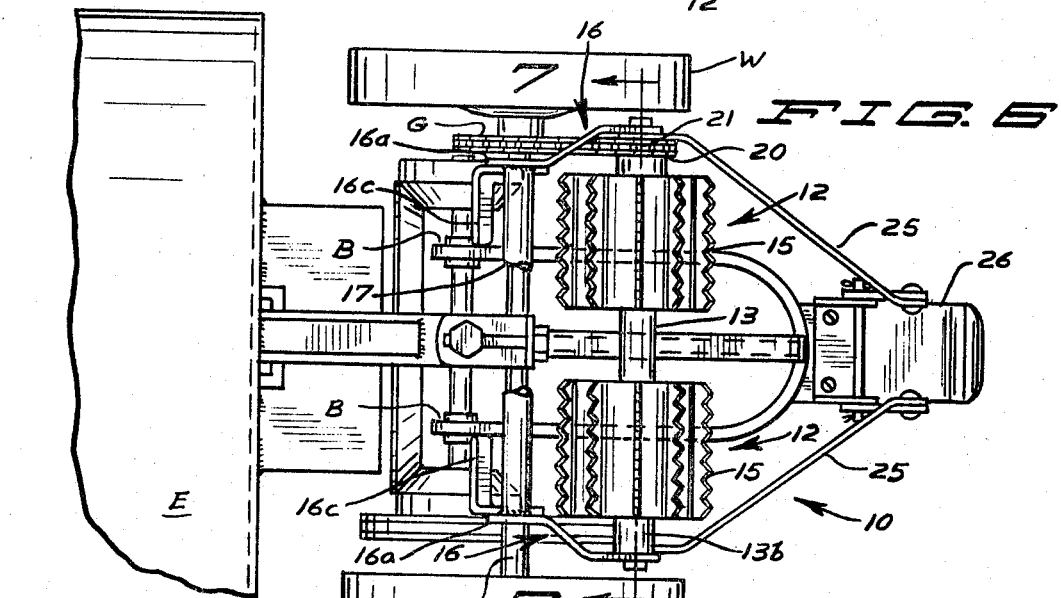
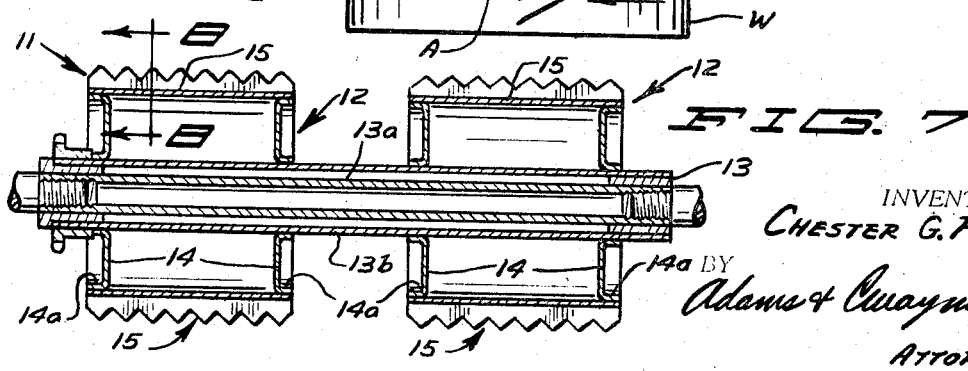

United States Patent Office 3,423,856
Patented Jan. 28, 1969

3,423,856
TRACTION DEVICE FOR SNOW VEHICLES
Chester G. Fiske, Minneapolis, Minn., assignor to Jari Corporation, Minneapolis, Minn., a corporation of Minnesota
Filed Oct. 14, 1965, Ser. No. 495,995
U.S. Cl. 37—43                                5 Claims
Int. Cl. E01h 5/04; B60k 23/08

ABSTRACT OF THE DISCLOSURE

This invention relates to a positionable drive mechanism for vehicles designed to travel over ice and snow and which will probably find its greatest use in connection with snow blowing equipment when the snow blower is operated on hard packed snow or ice. The invention includes a toothed cylinder member arranged in shiftable position with respect to the rear axle of the vehicle to which the unit is attached to permit shifting thereof downwardly into snow or ice contacting position to lift the rear wheels of the unit and thereby carry the major portion of the weight of the unit with drive means connected thereto for driving the toothed cylinder when in such lowered position. The positioning unit includes an overcenter relationship such that the traction toothed cylinder will be essentially locked in either of its available positions.

---

This invention relates generally to drive mechanisms for vehicles designed to travel over ice and snow and more particularly to a traction mechanism for a snow blower device to provide positive driving power when the snow blower is operated on ice or hard packed snow.

In the last few years snow blowing equipment for residential use has become very popular and the demand for improved snow blowing equipment is constantly growing.

Generally, snow blowing equipment provided for residential or small commercial use is designed to be operated by one man and usually includes a blower fan to receive the snow from the surface to be cleared for discharging the same to a remote location and at least a pair of drive wheels or the like for propelling the machine along the surface to be cleared of snow. Often in using these machines a problem of traction occurs when the surface to be cleared is icy or has become compacted with snow to develop a slippery surface. Most of the machines includes traction wheel mechanisms which even though having lugs around the periphery thereof, do not effectively grip this slippery surface and it often becomes necessary to supply additional traction and power to the unit such that it will move along such surfaces. Normally this additional traction and power stems from the person operating the unit in that he is required to push the unit over the icy or slippery surface and this of course is a tedious job often defeating the prime advantage of the machine.

Through the device provided in this invention a positive traction unit is provided for either intermittent or continuous operation in conjunction with the driving wheels of a snow blower unit or the like such that the unit may be easily engaged with the ground surface for adding the necessary positive traction force when the machine is being propelled over icy or slippery surfaces. This positive traction mechanism thus eliminates any additional pushing force to be provided by the user of the machine and therefore makes the snow clearing process much less tedious. Basically the unit as provided herein could be adapted to any device which requires added traction when being driven over slippery or icy surfaces and the principles of the device with certain structural modifications would perform the same functions for other vehicles as the device described herein.

The device as provided by applicant includes a pair of traction, toothed cylinders swingable into operative, surface engaging position where they will normally assume the driving task and swingable out of driving contact when the surface is sufficiently cleared to permit normal traction with the standard driving wheels of the unit.

The traction unit as further provided embodies a positive locking feature which cooperates with the forward movement of the machine and as the forces supplied to propel the machine and the position of the traction device tends to hold the traction unit in proper driving position thereby preventing accidental slippage from this desired position.

The unit likewise incorporates as an added driving function a particular placement of the driving wheels and a particular size of the traction cylinder whereby the weight of the snow blower unit is substantially supported thereabove to provide the necessary weight to drive the traction cylinder into the slippery or icy surface thereby insuring positive traction and whereby the size of the traction cylinder permits engagement of the normal driving wheels of the unit should the depth of the accumulated ice or snow be particularly great such that two pairs of cooperating driving forces are provided.

It is therefore an object of applicant's invention to provide a positive traction device for use with a vehicle driven over icy or slippery surfaces to insure positive driving traction of the unit therealong.

It is a further object of applicant's invention to provide a traction device for snow blowers and the like which is swingable into operative driving position and whereby the driving forces transmitted thereto provide a locking action to the device to prevent disengagement of the device from the surface over which the blower is being driven.

It is a further object of applicant's invention to provide a traction unit adapted to be received on a vehicle arranged to be driven over ice or slippery surfaces which may be easily and economically placed on the various snow blowing devices currently available.

These and other objects and advantages of my invention will more fully appear from the following description made in connection with the accompanying drawings, wherein like reference characters refer to the same or similar parts throughout the several views, and in which:

FIG. 3 is a view similar to FIG. 2 showing the traction device in driving position;

FIG. 4 is a rear elevation of the snow blower unit with the traction device shown in driving position;

FIG. 5 is a view similar to FIG. 2 taken from the opposite side of the unit;

FIG. 6 is a bottom plan view of the unit; and

FIG. 7 is a vertical section taken substantially along line 7—7 of FIG. 6 particularly illustrating the traction cylinder for the driving unit;

FIG. 8 is a section taken substantially along line 8—8 of FIG. 7.

Figure 1:
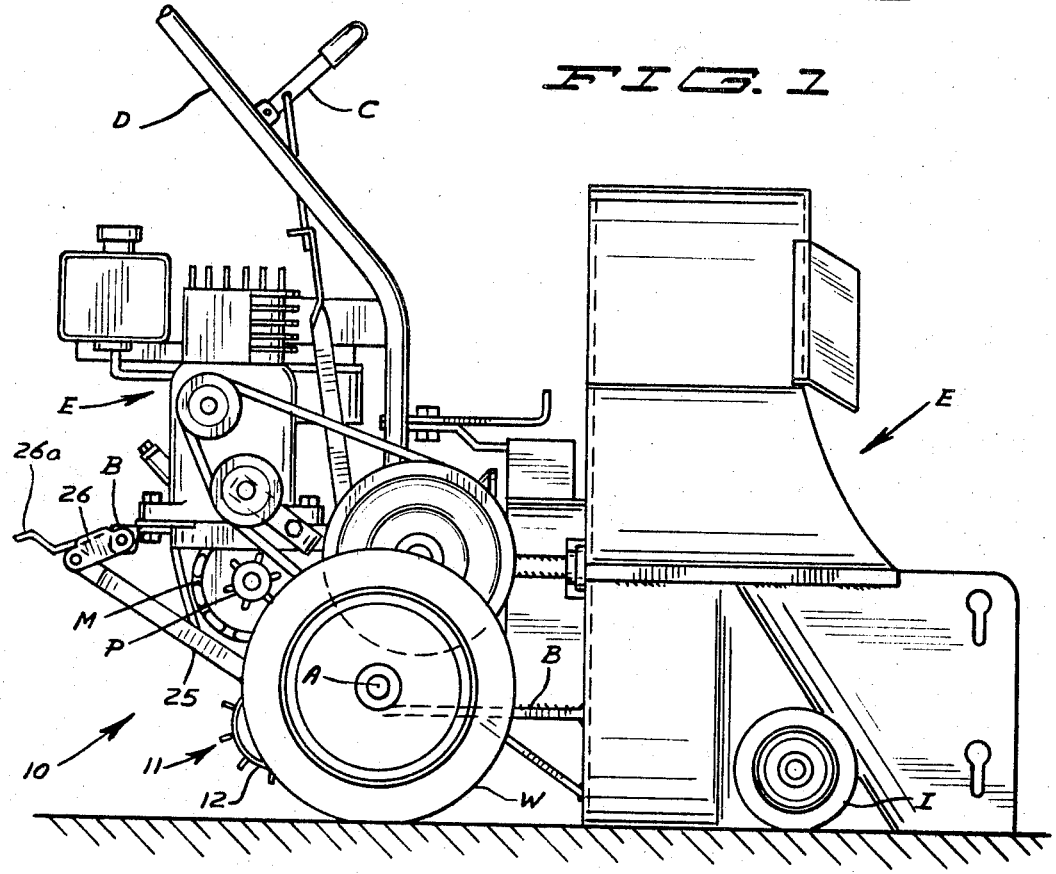
FIG. 1 is a side elevation of a snow blower provided with the traction device embodying the concepts of applicant's invention.

In accordance with the accompanying drawings and to best describe its operation, the positive traction device 10 embodying the concepts of applicant's invention is illustrated on a snow blower unit. It should be understood that this traction device could be used on various units designed to travel over icy or snowy surfaces but for purposes of explanation this unit is best illustrated on a snow blower.

Generally, snow blower construction includes a fan portion F including a blower and housing for discharging snow to a remote location with a pair of idler wheels I provided thereunder to partially support the weight of the fan unit F. Rearwardly of the fan F an engine E with appropriate controls for controlling the engine C and for steering the unit D are provided. In addition to these usual elements, a pair of drive wheels W are provided in supporting and driving relation to the unit and in the form shown these wheels W are rotatably mounted on an axle A which axle is rigidly connected to the blower frame B through various support bars and the like.

In the form of the snow blower illustrated the periphery of each drive wheel W is provided with a lugged structure and driving power is transmitted to these driving wheels W through a driving pinion P wherein the teeth of the pinion are received into the lugs of the wheels for driving thereof. Rotative power is transmitted to the pinion through a chain drive mechanism M which in turn receives power from the engine E through various drive pulleys or the like. It should be stated that the final result which permits adaptation of the unit 10 to any snow blower is a source of rotative power in close association to the unit 10 which source of power in this case is the driven wheel W.

As best illustrated in FIG. 7 the surface contacting and driving portion of the unit 10 is generally designated 11 and consists of a pair of traction mechanisms 12 spaced along a transversely extending axle structure consisting of an inner 13a and an outer 13b axle assembly. Each of the driving mechanisms 12 in the form shown consists of a pair of spaced substantially arcuate, flanged discs 14—14 securely attached to the outer axle portion 13b and a plurality of teethed arcuate segments 15 securely arranged therearound and attached to the outer flanges 14a of discs 14.

In the form shown and as best illustrated in FIG. 8, each of the toothed segments 15 includes outwardly extending teeth 15a adjacent an arcuately formed inner section 15b. As illustrated, each teethed portion 15a is arranged in adjacent position with respect to the teeth 15a of the next adjacent segment 15 and the unit is spot welded or otherwise joined to the outer flange 14a of disc 14 to provide a structure wherein a pair of adjacent teeth actually provide one ground engaging tooth when attached to the disc 14.

The traction device 11 is mounted for rotation about the axle structure 13 by providing the ends thereof to extend outwardly from the driving devices 12 and rotatably mounting the outwardly extending ends in a pair of bracket members 16—16. In the form shown these bracket members have the other end 16a thereof rotatably arranged about the axle to permit swinging therearound of the bracket 16 with drive device 11 carried therealong. A spacer bar 17 is provided between a lower end 16b—16b of bracket 16 to positively hold the special relation between said brackets 16—16. A portion of bracket end 16a adjacent the axial mounting portion provided with a cooperating lever section 16c which normally abuts against a portion of the frame B of the blower device to insure the spacial relation required at this end of bracket 16.

The attachment of the bracket 16, in order to facilitate the attachment of the traction device to various equipment now available, includes a slotted opening 18 formed in the bracket 16 to receive and pivot about axle A and a closure plate 19 adapted to be attached thereacross after receiving the axle A therein. Provision of the attachment method on bracket 16 permits placement of the traction unit 10 on many of the now available snow blowers without any major modifications being required to the unit.

Driving connection is afforded between the driver wheels W of the snow blower and the axle structure 13 of the traction unit 11 through a chain drive unit which includes a gear G fixedly attached to one of the driver wheels W and a pinion 20 fixedly attached to the axle 13 with a chain 21 encircling the two elements to provide the driving force therebetween.

Figure 2:
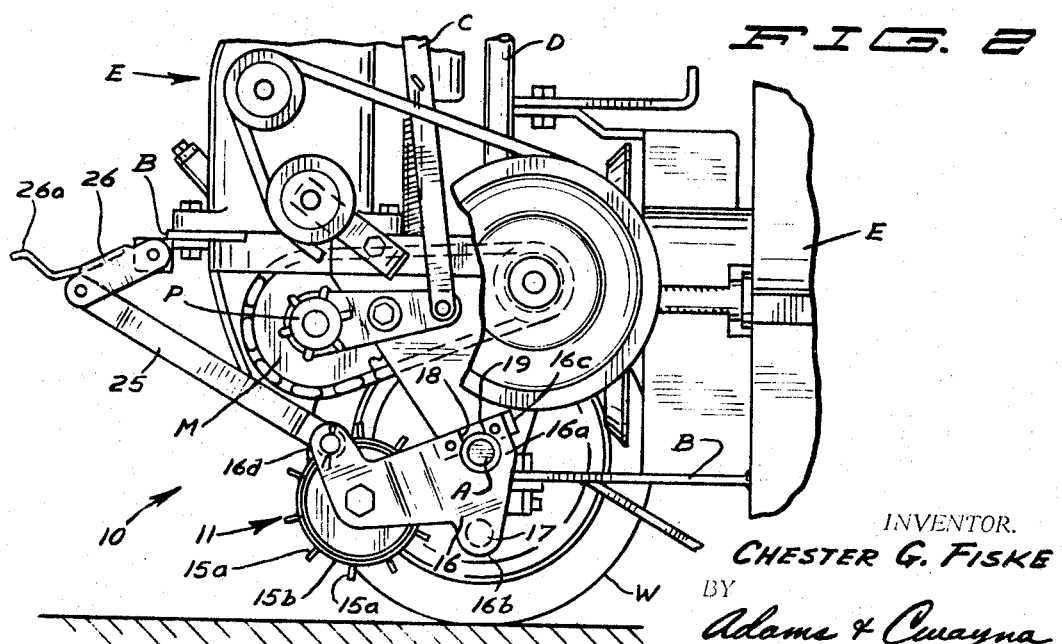
FIG. 2 is a view similar to FIG. 1 with portions thereof removed to more thoroughly illustrate the traction device and wherein the traction device is shown in non-driving position.

It should likewise be noted and as is best illustrated in FIGS. 2, 3 and 5, that the normal inoperative placement of the traction drive structure 11 is well below the frame work B and engine section E of the snow blower such that even when the device 11 is rotated which rotation corresponds to rotation of wheels W there will be no danger of injury to the operator. As also illustrated in FIG. 3, when the bracket 16 and the attached traction system 11 is swung downwardly into driving position, the primary weight of the snow blower will be directly thereabove thereby facilitating the best possible weight distribution when such extraction is desired.

In order to swing the traction mechanism 11 from inoperative to operative surfaces engaging position, a bifurcated handle structure including arms 25—25 and an intermediate linkage 26 is arranged and connected to another end 16d of bracket 16 and a portion of the frame B of the snow blower. The particular configuration of the bifurcated handle structure 25 and the intermediate linkage 26 provides an overcenter relation when the traction device 11 is placed into operative surface contacting position as illustrated in FIG. 3, which overcenter relation acts as a lock such that the traction unit 11 will not accidentally slip into inoperative position. An actuating grasping element 26a may be arranged on the end of intermediate linkage 26 to serve as a handle for shifting the traction unit 11 upwardly and downwardly. To insure the proper upward position of the traction unit 11, a retraction spring 27 is attached to bracket 16 and secured to a portion of the frame B of the blower. This spring 27 will serve to draw the traction device 11 out of possible interference position when the device 11 is not in use and to likewise hold the same in this position.

When the device 11 is in its downward ground contacting or surface contacting position the rotation of the unit is such as to drive the blower unit forward and this forward driving, in combination with the overcenter relationship of the bifurcated linkage, tends to accentuate the overcenter relationship and positively maintain a locked relationship. This, of course, is a safety factor insuring that when the traction mechanism 11 engages the ground it will not accidentally slip form this desired driving position.

As illustrated in FIG. 3 when the traction device 11 is shifted downwardly to engage the surface and drive the blower the ordinary drive wheels W are displaced upwardly such that they do not engage the surface. The specific design of the drive cylinders 12 does permit reengagement of the drive wheels W when the blower is driven over a compressible surface giving an added traction advantage. This reengagement is provided through the specific design and location of the toothed cylinders 12. When a compressible surface the weight of the blower will compress the surface and when the cylinders 12 have attained a one-fourth (¼) inch of compression past the root diameter or arcuate section 15b thereof the drive wheels W will again contact the surface thus providing four drive wheels. If the surface should not be compressible such as a thick ice surface the size of the cylinders 12 is such that the wheels W will not contact the surface and the weight of the blower on the limited area of the teethed cylinders 12 will effectively serve to cut into and chop the ice to aid in removal thereof.

It should be further noted that the gear G and the pinion 20 which afford the rotative connection between the wheels W and the traction device 10 are so designed that the outer periphery of the wheels W and the periphery of the cylinders 12 will move at exactly the same speed.

This, of course, eliminates any danger of jerking when the four possible drive mechanisms are all contacting the surface over which the unit is riding.

It should be obvious that the traction device 10 as provided herein will be easily mounted on various presently available snow blowing units or may be installed on a newly manufactured device. This adaptability of the traction device increases its commercial desire and will permit present owners of snow blowing apparatus to increase the usability of their machines.

It should be obvious that applicant has provided a new and unique traction device which although designed for a snow blower application is adaptable for use on various vehicles which are driven over icy or snowy surfaces and which will effectively transmit forward driving power to the vehicle for transportation over all surfaces.

It will, of course, be understood that various changes may be made in the form, details, arrangements and proportion of parts without departing from the scope of the invention, which generally stated consists in the matter set forth in the appended claims.

What I claim is:

1. A traction device for use with vehicles designed to be driven over surfaces coated with snow or the like having a frame and reardrive wheels, said device including:
    (a) a frame structure rotatably mounted on the frame of said vehicle;
    (b) a traction unit rotatably mounted on said frame structure including:
        (1) a first axle arranged generally parallel to the axle established between the driving wheels of said vehicle; and
        (2) at least one cylinder arranged on said first axle having a plurality of extending ground engaging surfaces on the outer peripheries thereof;
    (c) means for rotatably driving said traction unit; and
    (d) means for shifting said traction unit into surface engaging position including a linkage structure attached at one end to said frame structure and at the other end thereof to the frame of said vehicle, said linkage providing an overcenter relation in one position to lock said traction unit in ground engaging position and said vehicle being shifted upwardly from its normal drive wheel engagement with the surface to transfer the weight on said reardrive wheels to said traction unit; said linkage in the second position retracting the traction unit upwardly to permit engagement of the drive wheels with the surface.

2. The structure set forth in claim 1 wherein said cylinders include a plurality of arcuately formed segments having outstanding toothed portions on adjacent edges thereof with means for joining said segments into a continuous cylindrical surface.

3. The structure set forth in claim 2 and said linkage being of predetermined dimension to position the arcuately formed segments of said cylinders vertically below the periphery of said drive wheels when the traction unit is in surface engaging position whereby upon compression of the surface over which the vehicle travels the drive wheels will re-engage the surface to provide an additional set of traction wheels.

4. The structure set forth in claim 1 wherein said drive means connecting said traction unit for driving thereof is arranged and constructed to drive the periphery of said traction unit at the same peripheral speed as the drive wheels of the vehicle.

5. The structure set forth in claim 1 and retraction means attached to the vehicle frame to return said traction unit into inoperative position including a spring member attached at one end to said vehicle frame and attached at the other end to said frame structure.

References Cited

UNITED STATES PATENTS

| 1,769,074 | 7/1930 | Ruatti | 180—15 X |
| 2,476,526 | 7/1949 | Badlat. | |
| 2,770,894 | 11/1956 | Gettleman | 37—43 |

ABRAHAM G. STONE, *Primary Examiner.*

STEPHEN C. PELLEGRINO, *Assistant Examiner.*

U.S. Cl. X.R.

180—15